United States Patent [19]

Arendt

[11] Patent Number: 5,236,987
[45] Date of Patent: Aug. 17, 1993

[54] ISODECYL BENZOATE COALESCING AGENTS IN LATEX COMPOSITIONS

[75] Inventor: William D. Arendt, Mundelein, Ill.

[73] Assignee: Velsicol Chemical Corporation, Rosemont, Ill.

[21] Appl. No.: 716,895

[22] Filed: Jun. 18, 1991

Related U.S. Application Data

[63] Continuation-in-part of Ser. No. 604,349, Oct. 25, 1990, abandoned, which is a continuation of Ser. No. 69,394, Jul. 2, 1987, abandoned.

[51] Int. Cl.$^5$ ............................................. C08K 5/09
[52] U.S. Cl. .................................. 524/287; 106/14.35; 106/14.41
[58] Field of Search ................... 524/297, 287; 106/14.35, 14.41

[56] References Cited

FOREIGN PATENT DOCUMENTS 0026982  4/1981  European Pat. Off. ............ 524/297

Primary Examiner—Joseph L. Schofer
Assistant Examiner—Peter D. Mulcahy
Attorney, Agent, or Firm—Allegretti & Witcoff, Ltd.

[57] ABSTRACT

This application discloses the use of esters of benzoic acid having from about 8 to about 12 carbon atoms in the ester moiety as coalescent agents for paint compositions and for use in the preparation of plastisols.

2 Claims, No Drawings

ISODECYL BENZOATE COALESCING AGENTS IN LATEX COMPOSITIONS

The following is a continuation-in-part of file wrapper continuation application Ser. No. 07/604,349, filed Oct. 25, 1990, now abandoned, which is a continuation of parent application Ser. No. 07/069,394, filed on Jul. 2, 1987, now abandoned.

BACKGROUND OF THE INVENTION

This invention relates to new monobenzoate esters. In particular, it relates to new esters useful as coalescing agents in paint formulations and also as plasticizers.

One of the desired qualities of paint is that they produce a uniform coating. In order to have the proper film formation, coalescent agents are incorporated into paint formulations. One of the commercial coalescing agents used in paint formulations is texanol. There is a need for additional coalescing agents since texanol does not impart the required characteristics to all paint formulations.

It is therefore an object of the present invention to devise new coalescing agents for paint formulations.

Another object of the present invention is the preparation of latex formulations that are stable at a wide range of temperatures.

Still another object of the present invention is the creation of plasticizers having good campatability with various resinous materials.

Other objects of the present invention will become apparent from the ensuing description.

SUMMARY OF THE INVENTION

This invention is directed to the use of esters of benzoic acid having about 10 to about 12 carbon atoms in its ester moiety, as a coalescing agent for paint compositions and in the manufacture of plastisols. In particular, it is preferred to use hydrocarbon esters of benzoic acids for these purposes.

The compounds of the present invention can be prepared by the reaction of benzoic acid and an aliphatic alcohol of the following structural formula:

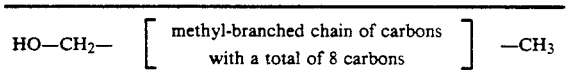

This reaction can be performed using standard esterification conditions, removing the water of reaction continuously as formed. An esterification catalyst is used to maximize yields. Examples of esterification catalysts which can be used include stanneous oxide, stanneous diacetate, monobutyl tin oxide, butyl tin tris 2-ethyl hexanoate, dibutyl tin diacetate, dibutyl tin oxide, stannous benzoate, p-toluene sulfonic acid, sulfonic acid, phosphoric acid, hydrochloric acid, aluminum trichloride, methane sulfonic acid, tetraisopropyl titanate, zirconium carbonate and ion-exchange resins. Temperatures of up to about 250° C. are sufficient. While the reaction is equimolar, it is preferred to use a slight molar excess of benzoic acid. Other reaction variables that can be used include the presence of an azeotrope such as cyclohexane, but are not necessary for the formation of the compounds of the present invention The following examples illustrate the preparation of the present compounds, but it is to be understood that the present compounds can be made by other procedures:

While the examples only show the preparation of isodecyl benzoate, the same procedures can be used for the preparation of the other compounds of the present invention.

EXAMPLE 1

Preparation of Isodecyl Benzoate

Isodecyl alcohol 316 grams; 2 moles); benzoic acid (250 grams; 2.05 moles), toluene (100 ml) and para toluene sulfonic acid (2 grams) were placed into a glass reaction flask equipped with stirrer, thermometer, heating mantle, 12" column packed with ¼" glass rings, Dean-Stark water trap, and condenser. The temperature increased from 26° C. to 187° C. as the reaction proceeded with stirring Then the reaction mixture was cooled to 100° C. Soda ash (100 ml; 20% solution) was added to the mixture and was followed by the addition of a mixture of soda ash (50 ml; 20% solution) and chlorox (100 ml) at 81°-100° C. The alkaline bottom layer was separated from the mixture. After the mixture was dried, the toluene was removed by heating the mixture to 178° C. at 45 mmHg. The desired product (515 grams) was obtained after filtration, representing a yield of 98.3%.

EXAMPLE 2

Preparation of Isodecyl Benzoate

Isodecyl alcohol (306 grams; 1.94 moles), benzoic acid (242 grams; 1.98 moles), toluene (50 ml) and butyltinoxide hydrate (1 gram) were placed into a glass reaction flask equipped with stirrer, thermometer, heating mantle, 12" column packed with ¼" glass rings, Dean-Stark water trap and condenser. The mixture was stirred for four hours allowing the temperature to increase from 30° C. to 204° C. After reaction mixture was cooled to 100° C., soda ash (100 ml; 20% solution) was added and the temperature increased from 65° to 95° C. After ten minutes, the alkaline bottom layer was separated and a mixture of soda ash (50 ml; 20% solution) and chlorox (140 ml) added to the reaction mixture. After the bottom layer was removed, the mixture was dried and the toluene was removed by heating to 182° C. at 45 mmHg. The desired product (491 grams) was obtained after filtration representing a yield of 96.7%.

EXAMPLE 3

Preparation of Isodecyl Benzoate

Isodecyl alcohol (791.4 grams; 5.-0 mol), benzoic acid (622.8 grams; 5.1 mol), zirconium carbonate (3.3 grams) and toluene (75 ml) were placed into a three-necked, round bottom flask equipped with stirrer, thermometer, 10" Vigeraux column, water trap and condenser. The reaction temperature was 184° C., washed first with water (25 mls) at 90°-95° C. for 30 minutes, then with sodium carbonate (15%) at 90°-95° C. for 30 minutes and twice with water (300 ml) at 90° C. for five minutes. After being washed, the product was dried at 125° C. and filtered to yield the desired product (1254.6 grams; 95.6% yield). It assayed 99.5% with the following properties:

| | |
|---|---|
| Hydroxyl No. | 7.8 mg KOH/gm |
| Color | 30 APHA |

| | |
|---|---|
| Acidity | <0.01% |
| Moisture | 0.02% |

Other compounds within the present invention include, but are not limited to, decyl benzoate, isooctyl benzoate, nonylbenzoate undecyl benzoate, dodecyl benzoate and isododecyl benzoate It has now been found that compounds of the structural formula (I) have excellent properties as coalescent agents in latex based paints. Coalescent agents perform an important function in paints in the formation of a continuous film at all temperatures of application of the paint. The amount of the coalescent agent in the paint will vary with the other components of the paint. Most latex paints are either acrylic or vinyl acrylic based products In addition, the paints contain a variety of other components including pigments, binders, fillers, dispersants, thickeners and anti-freeze agents. The identity of these components is well known to paint formulators.

Generally the paint formula will contain from about 4 to about 12% by weight of the coalescent agent, although other amounts can often be used. Normally, the coalescent agent can be added to the binder, filler, dispersant, thickeners and other additives by first making a slurry of such materials on a high speed mill and grinding the pigment on a high speed mill into the slurry. Then the coalescent agent can be added into the slurry on the high speed mill. Finally, the slurry can be let down into the latex on a low speed mixer.

In order to determine the effectiveness of the compounds of Formula (I) as coalescent agents, the following tests of typical paint formulations containing isodecyl benzoate as the coalescent agent were performed comparing the benzoate esters of the present invention with a paint formulation containing texanol, a commercial coalescent agent.

EXAMPLE 4

The following tests were performed:

1. Viscosity: Determined by use of a Stormer Viscometer immediately after the paint formulation has been adjusted to room temperature.

2. Weight: Determined after the paint formulation has been adjusted to room temperature and stirred for 30 minutes.

3. Color: Panels were made with a 0.003 Bird Blade on Lenata White chart. Reflectance was read on Applied Color Spectra's Sensor at 540 mm.

4. Color Acceptance: Mixes were made using Nirodox yellow oxide and phthalo blue 888 colorants at a level of two ounces per gallon of paint and were shaken on a Red Devil Paint shaker for three minutes Test panels were made by making a 0.003 Bird Blade drawdown and a brushout on a Lenata chart. Color differences of drawdown versus brushout were determined using Applied Color Systems' computer system.

5. Hiding Power: Contrast ratio was determined by first measuring reflectance on white and black are as taken from a 0.003 Hard Blade drawdown on a Lenata opacity chart. The contrast ratio was calculated by dividing the reflectance on the black area by the reflectance on the white area.

6. Sheen: Read hiding power panels on 60° and 85° Gardner Gloss Meter after 48 hours dry.

7. Porosity: Paints were checked according to ASTM D-3258-80 and the loss in reflectance determined and reported as the percent retained 8. Freeze-Thaw: ¼ pint samples of each paint were cycled for eight hours at −15° F. and 16 hours at room temperature. The paints were checked after each cycle for five cycles.

9. Oven Stability: Determined change in viscosity of the paints after six days at 120° F.

10. Low Temperature Filming: 0.003 Bird Blade drawdowns were made on the backside of Lenata panels and dried 48 hours at 40° F. Panels were examined for cracks with 60× magnification The formulation was prepared by mixing the following ingredients for four minutes on a Cowles mill:

| Component | Pounds | Gallons |
|---|---|---|
| Water | 250.0 | 30.0 |
| Ethylene Glycol | 20.0 | 2.15 |
| Colloid 643 | 2.0 | 0.27 |
| Bioban CS-1135 | 2.0 | 0.24 |
| Cellosize FR-1500 | 4.5 | 0.39 |
| AMP-95 | 1.0 | 0.10 |
| Colloid 224 | 5.0 | 0.50 |
| Triton N-101 | 2.0 | 0.23 |
| Tronox CR-800 | 220.0 | 6.77 |
| Santinone #1 | 110.0 | 5.02 |
| Snowflake | 120.00 | 5.33 |

Texanol and isodecyl benzoate were added to aliquots of the formulation to prepare a paint having the indicated percentage of coalescent agent by weight based on resin solids.

| | TEXANOL | | | WATER | | ISODECYL BENZOATE | | |
|---|---|---|---|---|---|---|---|---|
| FORMULATION | Pounds | Gallons | % | Pounds | Gallons | Pounds | Gallons | % |
| 1 | 9.9 | 1.25 | 6 | 5.1 | 0.61 | 0 | 0 | 0 |
| 2 | 0 | 0 | 0 | 8.6 | 1.03 | 6.6 | 0.83 | 4.0 |
| 3 | 0 | 0 | 0 | 5.1 | 0.61 | 9.9 | 1.25 | 6.0 |
| 4 | 0 | 0 | 0 | 0 | 0 | 14.9 | 1.87 | 9.0 |

| FORMULATION | INITIAL VISCOSITY (K.U.) | WEIGHT (Lbs/Gal) | COLOR ACCEPTANCE | HIDING POWER | SHEEN 60° F. | SHEEN 85° F. | COLOR |
|---|---|---|---|---|---|---|---|
| 1 | 83 | 11.68 | 0.37 | 0.9706 | 2 | 3 | 91.19 |
| 2 | 78 | 11.68 | 0.27 | 0.9730 | 2.5 | 3 | 91.32 |
| 3 | 77 | 11.68 | 0.33 | 0.9763 | 2 | 3 | 91.37 |
| 4 | 81 | 11.68 | 0.31 | 0.9804 | 2.5 | 3 | 91.19 |

| FORMULATION | POROSITY % Retained | FREEZE THAW | OVEN STABILITY (% Decrease) In Viscosity |
|---|---|---|---|
| 1 | 95.91 | Passed | 3.61 |

| | | | |
|---|---|---|---|
| -continued | | | |
| 2 | 95.76 | Passed | 7.69 |
| 3 | 95.71 | Passed | 8.97 |
| 4 | 97.27 | Passed | 7.50 |

EXAMPLE 5

Additional tests were performed on a second set of paint formulations containing texanol and isodecyl benzoate, as follows:

1. Viscosity: Determined using ASTM procedure D-562.
2. Package Stability: Determined using ASTM procedure D-1849.
3. Washability: Determined using ASTM procedure D-3450.
4. Scrub Resistance: Determined using ASTM procedure D-2486.

the following formulation was prepared:

| | Pounds |
|---|---|
| Water | 250.0 |
| Ethylene Glycol | 20.0 |
| Colloid | 2.0 |
| Bioban CS-1135 | 2.0 |
| Cellosize ER-1500 | 4.5 |
| AMP-95 | 1.0 |
| Colloid-224 | 5.0 |
| Triton N-101 | 2.0 |
| Tronox CR-800 | 220.0 |
| Sanitone #1 | 110.0 |
| Snowflake | 120.0 |

Texanol and isodecyl benzoate were mixed into aliquots of this formulation. 9.9 pounds of texanol and 9.9 pounds of isodecyl benzoate were mixed into aliquots of this formulation to prepare formulations 5 and 6 each containing six percent by weight of the respective coalescent Then the following ingredients were mixed into each formulation to prepare the test paint formulations:

| Component | Pounds |
|---|---|
| UCAR 367 | 301.0 |
| Colloid 643 | 2.0 |
| Water | 113.4 |

The two paint formulations were tested with the following results:

EXAMPLE 6

Tests were performed as follows:

1. Viscosity: With a Stormer Viscometer according to ASTM D562-81.
2. Acidity: pH was determined using a Beckman model H-2, using Federal Test Method Number 141, Method 5111.
3. Grind: Determined using Hegman grind gauge according to ASTM D1210-79.
4. Gloss and Sheen: Determined using Byk Multi-angle reflectometer, according to ASTM D523-80.
5. Scrub resistance: Determined with a Gardner scrub machine according to ASTM D2486-79.
6. Contrast Ratio: Determined according to Federal Test Method Standard Number 141, Method 4122.1 and ASTM D2805-80.
7. Flow, Leveling and Sag Resistance: Determined according to ASTM D2801-69. The relative flow and leveling is reported on a scale of 1 to 10 with 10 representing excellent and 0 representing poor flow.
8. Stain Removal: Determined by a modified version of ASTM D2198-84 in which films are applied to a Lenata card drawn down with a Bird-type applicator, 8-mil wet and dried at least ten days. The ease of removal of each stain using 20 hand washing cycles with a cheesecloth pad wet with Ivory soap or Fantastick household cleaner is recorded on a 1-5 scale as follows: 5=100% removal; 4=75% removal; 3=50% removal; 2=25% removal and 1=0% removal.
9. Water Spotting: Determined by a modified version of ASTM D2571 with films applied with a drawn-down bar, 4-mil wet and dried at least seven days. Then a draw of water is put on the film and allowed to stand for 30 minutes before being blotted dry. The film is examined for softening and again after 24 hours drying for extent of recovery.
10. Blocking: Determined according to a modified version of ASTM D2793-69. Films are applied to Lenata form 7B using a draw-down bar to give a 4-mil wet film and dried at least ten days. One inch strips are placed face-to-face under a weight providing one pound per square inch pressure in an oven set at 120° F. for one hour. The assembly is removed, cooled and pulled apart noting any transfer of paint from one surface to the other.

| | VISCOSITY (KU) | | WASHABILITY | SCRUB RESISTANCE |
|---|---|---|---|---|
| FORMULATION | Initial | 2 Weeks @ 125° F. | Reflectance Recovery % | Cycles to Failure |
| 5 | 82 | 78 | 94.26 | 770 |
| 6 | 82 | 77 | 94.25 | 865 |

| | PACKAGE STABILITY 2 Weeks @ 125° F. | | | |
|---|---|---|---|---|
| FORMULATION | Skinning | Phase Separation | Settling | Base of Remix |
| 5 | None | Trace | None | Excellent |
| 6 | None | Trace | None | Excellent |

11. Low Temperature Coalescence Test: A three mil wet film of the test paint is cast on a sealed Leneta Form 7B chart, using paint which has been pre-conditioned at 50°-55° F. The films are allowed to dry in a cold room or chamber maintained at 45°-5° F. overnight with free passage of air. A film (3-mil wet) of an alkyd based semi-gloss paint is then drawn down across the paint film in a way that some area of the semi-gloss is also covering the bare chart. After 48 hours drying at ambient laboratory conditions, 60° gloss readings are made of the semi-gloss over both the test paint area and the bare chart area. The ratio of these two readings (gloss over test paint/gloss over are chart) is calculated. Ra- -continued

| Ingredients | Pounds |
|---|---|
| Nopco NDW | 2.0 |
| Water | 45.0 |
| Super Ad-it | 1.0 |
| Ti-Pure R-900 | 210.0 |
| ASP-170 | 45.0 |

Texanol and isodecyl benzoate were mixed into separate aliquots of this formulation on a high speed mill for seven minutes. Then the slurry was let down into the following mixture to prepare the test paint formulations.

|  | | 4% Coalescent | | 8% Coalescent | | 12% Coalescent | |
|---|---|---|---|---|---|---|---|
|  | | Texanol | Isodecyl Benzoate | Texanol | Isodecyl Benzoate | Texanol | Isodecyl Benzoate |
| Isodecyl Benzoate | | 9.2 | 0 | 18.3 | 0 | 27.7 | 0 |
| Texanol | | 0 | 9.2 | 0 | 18.3 | 0 | 27.7 |
| Water | | 25.0 | 25.0 | 25.0 | 25.0 | 25.0 | 25.0 |
| Rhoplex AC-490 | | 497.2 | 497.2 | 497.2 | 497.2 | 497.2 | 497.2 |
| Nopco NDW | | 1.0 | 1.0 | 1.0 | 1.0 | 1.0 | 1.0 |
| Ammonia (28%) | | 1.8 | 1.8 | 1.8 | 1.8 | 1.8 | 1.8 |
| Acrysol RM-5 | | 30.0 | 30.0 | 30.0 | 30.0 | 30.0 | 30.0 |
| Water | Premix | 21.0 | 21.0 | 21.0 | 21.0 | 21.0 | 21.0 |
| Ammonia (28%) | | 1.0 | 1.0 | 1.0 | 1.0 | 1.0 | 1.0 |
| Water | | 21.0 | 21.0 | 21.0 | 21.0 | 21.0 | 21.0 |
| Water | | 40.2 | 40.2 | 30.5 | 30.5 | 20.6 | 20.6 |

PVC = 25.5%
Volume solids = 31.95%

| Paint | Coalescent & Level | Stomer Viscosity (K.U.'s) | pH | Hegman Grind | Weight per Gallon | Reflectance | Contrast Ratio |
|---|---|---|---|---|---|---|---|
| 1 | 1-4% | 94 | 8.5 | 7.5 | 10.27 | 90.5 | 0.983 |
| 2 | 1-8% | 101 | 8.5 | 7.5 | 10.27 | 90.5 | 0.989 |
| 3 | 1-12% | 99 | 8.5 | 7.5 | 10.29 | 92.0 | 0.978 |
| 4 | 3-4% | 90 | 8.5 | 7.5 | 10.27 | 90.5 | 0.983 |
| 5 | 3-8% | 96 | 8.5 | 7.5 | 10.28 | 91.0 | 0.989 |
| 6 | 3-12% | 97 | 8.5 | 7.5 | 10.26 | 91.0 | 0.989 |
| 7 | none | 89 | 8.3 | 7.5 | 10.25 | 91.0 | 0.988 |

| Paint | Coalescent & Level | F/T | Scrub Cycles | Water Spotting | 60° Gloss (Hours) 24 | 48 | 85° Sheen (Hours) 24 | 48 | Blocking |
|---|---|---|---|---|---|---|---|---|---|
| 1 | 1-4% | 5 | 387 | OK | 45 | 41 | 82 | 83 | Passed |
| 2 | 1-8% | 5 | 419 | OK | 43 | 35 | 83 | 81 | Passed |
| 3 | 1-12% | 5 | 483 | OK | 53 | 48 | 87 | 86 | 5% Trans. |
| 4 | 3-4% | 5 | 268 | OK | 43 | 39 | 83 | 80 | Passed |
| 5 | 3-8% | 5 | 384 | OK | 53 | 50 | 85 | 85 | Passed |
| 6 | 3-12% | 5 | 407 | OK | 31 | 29 | 80 | 78 | Passed |
| 7 | none | 5 | 318 | OK | 56 | 55 | 87 | 87 | Passed |

| Paint | Coalescent & Level | Low Temperature Coalescence Test | Color Accept. | Stain Removal Pencil F | I | Crayon F | I | Lipstick F | I | Ballpoint F | I |
|---|---|---|---|---|---|---|---|---|---|---|---|
| 1 | 1-4% | 1.07 | Equal | 4 | 5 | 5 | 3 | 5 | 5 | 4 | 4 |
| 2 | 1-8% | 1.19 | Darker | 5 | 5 | 4 | 5 | 5 | 5 | 4 | 4 |
| 3 | 1-12% | 1.09 | Darker | 5 | 5 | 5 | 5 | 5 | 5 | 3 | 3 |
| 4 | 3-4% | * | Lighter | 5 | 5 | 4 | 5 | 5 | 5 | 4 | 5 |
| 5 | 3-8% | 1.04 | Lighter | 5 | 4 | 4 | 4 | 5 | 5 | 4 | 4 |
| 6 | 3-12% | 1.02 | Lighter | 4 | 4 | 4 | 4 | 5 | 5 | 3 | 3 |
| 7 | none | 1.08 | Std. | 5 | 5 | 5 | 4 | 5 | 5 | 2 | 2 |

*sample inadvertently omitted from test.

tios around 1.00 indicate good low temperature coalescence of the test paint.

Three paint formulations containing texanol (Coalescent 3) and isodecyl benzoate (Coalescent 1) were prepared. The first paint formulation was made by blending the following components into a slurry:

| Ingredients | Pounds |
|---|---|
| Propylene glycol | 70.0 |
| Tamol SG-1 | 12.0 |

The second paint formulation was made by blending the following components into a slurry:

| Ingredients | Pounds |
|---|---|
| Natrosol 250MBR | 5.0 |
| Ethylene glycol | 33.4 |
| Water | 200.0 |
| Tamol 850 | 8.0 |
| Super Ad-it | 6.0 |
| Nopco NDW | 2.0 |

| Ingredients | Pounds |
|---|---|
| Ti-Pure R-902 | 225.0 |
| Al-Sil-Ate NC | 2.0 |

Texanol and isodecyl benzoate were mixed into separate aliquots of this formulation on a high speed mill for seven minutes. Then the slurry was let down into the following mixture to prepare the test paint formulations:

| Ingredients | Pounds |
|---|---|
| Methyl Carbitol | 45.0 |
| Tamol QR 1124 | 3.0 |
| Triton CF-10 | 1.8 |
| Foamaster AP | 1.5 |
| Ti-Pure R-900 | 196.0 |

Texanol and isodecyl benzoate were mixed into separate aliquots of this formulation on a high speed mill for seven minutes. Then the slurry was let down into the

|  | 3% Coalescent | | 6% Coalescent | | 9% Coalescent | |
|---|---|---|---|---|---|---|
|  | Texanol | Isodecyl Benzoate | Texanol | Isodecyl Benzoate | Texanol | Isodecyl Benzoate |
| Isodecyl Benzoate | 7.2 | 0 | 14.0 | 0 | 21.6 | 0 |
| Texanol | 0 | 7.2 | 0 | 14.0 | 0 | 21.6 |
| Rhoplex AC-64 | 396.5 | 396.5 | 396.5 | 396.5 | 396.5 | 396.5 |
| Nopco NDW | 1.0 | 1.0 | 1.0 | 1.0 | 1.0 | 1.0 |
| Water | 83.7 | 83.7 | 81.4 | 81.4 | 84.9 | 84.9 |
| 2.5% Natrosol 250MBR | 85.6 | 85.6 | 80.7 | 80.7 | 69.2 | 69.2 |

PVC = 20.2%
Volume solids = 26.2%

| Paint | Coalescent & Level | Stomer Viscosity (K.U.'s) | pH | Hegman Grind | Weight per Gallon | Reflectance | Contrast Ratio |
|---|---|---|---|---|---|---|---|
| 1 | 1-3% | 84 | 8.6 | 6.5 | 10.44 | 90.0 | 0.983 |
| 2 | 1-6% | 85 | 8.7 | 6.5 | 10.54 | 89.5 | 0.978 |
| 3 | 1-9% | 86 | 8.3 | 6.5 | 10.55 | 89.0 | 0.978 |
| 4 | 3-3% | 90 | 8.8 | 6.5 | 10.53 | 90.0 | 0.978 |
| 5 | 3-6% | 82 | 8.9 | 6.5 | 10.53 | 90.5 | 0.983 |
| 6 | 3-9% | 89 | 7.4 | 6.5 | 10.53 | 90.0 | 0.978 |
| 7 | none | 85 | 8.8 | 6.5 | 10.62 | 90.0 | 0.983 |

| Paint | Coalescent & Level | F/T | Scrub Cycles | Water Spotting | 60° Gloss (Hours) 24 | 48 | 85° Sheen (Hours) 24 | 48 | Blocking |
|---|---|---|---|---|---|---|---|---|---|
| 1 | 1-3% | 5 | 266 | Softens | 11 | 10 | 48 | 46 | Passed |
| 2 | 1-6% | 5 | 296 | Dulls | 13 | 11 | 50 | 45 | Passed |
| 3 | 1-9% | 5 | 166 | Dulls | 21 | 18 | 68 | 61 | Passed |
| 4 | 3-3% | 5 | 248 | Halo | 10 | 9 | 43 | 42 | Passed |
| 5 | 3-6% | 5 | 292 | Dulls | 12 | 10 | 39 | 36 | Passed |
| 6 | 3-9% | 5 | 352 | Dulls | 36 | 32 | 80 | 76 | Passed |
| 7 | none | 5 | 170 | Dulls | 10 | 8 | 52 | 50 | Passed |

| Paint | Coalescent & Level | Low Temperature Coalescence Test | Color Accept. | Stain Removal Pencil F | I | Crayon F | I | Lipstick F | I | Ballpoint F | I |
|---|---|---|---|---|---|---|---|---|---|---|---|
| 1 | 1-3% | 0.98 | Darker | 4 | 4 | 5 | 5 | 5 | 5 | 3 | 3 |
| 2 | 1-6% | 0.98 | Darker | 4 | 4 | 5 | 5 | 5 | 5 | 3 | 3 |
| 3 | 1-9% | 0.98 | Darker | 4 | 4 | 5 | 5 | 5 | 5 | 3 | 3 |
| 4 | 3-3% | 0.97 | Darker | 5 | 4 | 5 | 5 | 5 | 5 | 3 | 2 |
| 5 | 3-6% | 1.05 | Darker | 4 | 4 | 5 | 5 | 5 | 5 | 3 | 3 |
| 6 | 3-9% | 1.03 | Darker | 4 | 4 | 5 | 4 | 5 | 5 | 2 | 3 |
| 7 | none | 1.02 | Std. | 4 | 4 | 5 | 5 | 5 | 5 | 3 | 3 |

The third paint formulation was made by blending the following components into a slurry:

following mixture to prepare the test paint formulations:

|  | 10% Coalescent | | 15% Coalescent | | 20% Coalescent | |
|---|---|---|---|---|---|---|
|  | Texanol | Isodecyl Benzoate | Texanol | Isodecyl Benzoate | Texanol | Isodecyl Benzoate |
| Isodecyl Benzoate | 23.1 | 0 | 34.6 | 0 | 46.2 | 0 |
| Texanol | 0 | 23.1 | 0 | 34.6 | 0 | 46.2 |
| Rhoplex HG74A | 543.5 | 543.5 | 543.5 | 543.5 | 543.5 | 543.5 |
| Foamaster AP | 0.5 | 0.5 | 0.5 | 0.5 | 0.5 | 0.5 |
| Dowicil 75 (Premix) | 1.6 | 1.6 | 1.6 | 1.6 | 1.6 | 1.6 |
| Water | 6.4 | 6.4 | 6.4 | 6.4 | 6.4 | 6.4 |
| Water | 15.0 | 15.0 | 15.0 | 15.0 | 15.0 | 15.0 |
| Acrysol RM-5 (Premix) | 35.0 | 35.0 | 35.0 | 35.0 | 35.0 | 35.0 |
| Water | 15.0 | 15.0 | 15.0 | 15.0 | 15.0 | 15.0 |
| Ammonia (28%) | 1.8 | 1.8 | 1.8 | 1.8 | 1.8 | 1.8 |

| | | -continued | | | | |
|---|---|---|---|---|---|---|
| Water | 107.9 | 107.9 | 87.4 | 87.4 | 75.1 | 75.1 |

PVC = 17.2%
Volume solids = 32.7%

| Paint | Coalescent & Level | Stomer Viscosity (K.U.'s) | pH | Hegman Grind | Weight per Gallon | Reflectance | Contrast Ratio |
|---|---|---|---|---|---|---|---|
| 1 | 1-10% | 87 | 8.8 | 7.0 | 10.11 | 89.5 | 0.983 |
| 2 | 1-15% | 94 | 8.9 | 7.0 | 10.01 | 90.5 | 0.978 |
| 3 | 1-20% | 103 | 8.9 | 7.0 | 10.03 | 90.0 | 0.983 |
| 4 | 3-10% | 88 | 8.8 | 7.0 | 10.08 | 89.5 | 0.978 |
| 5 | 3-15% | 96 | 8.8 | 7.0 | 10.05 | 90.0 | 0.983 |
| 6 | 3-20% | 103 | 8.8 | 7.0 | 10.02 | 90.5 | 0.978 |
| 7 | none | 80 | 8.8 | 7.0 | 10.14 | 89.5 | 0.983 |

| Paint | Coalescent & Level | F/T | Scrub Cycles | Water Spotting | 60° Gloss (Hours) 24 | 48 | 85° Sheen (Hours) 24 | 48 | Blocking |
|---|---|---|---|---|---|---|---|---|---|
| 1 | 1-10% | 5 | 106 | OK | 76 | 73 | 92 | 88 | Passed |
| 2 | 1-15% | 2 | 132 | OK | 80 | 76 | 93 | 91 | Passed |
| 3 | 1-20% | 0 | 176 | OK | 73 | 80 | 93 | 91 | Passed |
| 4 | 3-10% | 2 | 282 | OK | 76 | 76 | 92 | 92 | Passed |
| 5 | 3-15% | 2 | 208 | OK | 77 | 77 | 94 | 92 | Passed |
| 6 | 3-20% | 0 | 250 | OK | 73 | 76 | 92 | 90 | Passed |
| 7 | none | 5 | 160 | OK | 72 | 74 | 91 | 90 | Passed |

| Paint | Coalescent & Level | Low Temperature Coalescence Test | Color Accept. | Stain Removal Pencil F | I | Crayon F | I | Lipstick F | I | Ballpoint F | I |
|---|---|---|---|---|---|---|---|---|---|---|---|
| 1 | 1-10% | 0.83 | Lighter | 5 | 5 | 5 | 5 | 5 | 5 | 5 | 5 |
| 2 | 1-15% | 0.90 | Lighter | 4 | 4 | 5 | 5 | 5 | 5 | 5 | 5 |
| 3 | 1-20% | 0.82 | Lighter | 5 | 5 | 5 | 5 | 5 | 5 | 5 | 5 |
| 4 | 3-10% | 0.77 | Equal | 5 | 4 | 5 | 5 | 5 | 5 | 5 | 5 |
| 5 | 3-15% | 0.73 | Darker | 4 | 4 | 5 | 5 | 5 | 5 | 5 | 5 |
| 6 | 3-20% | 0.69 | Darker | 4 | 4 | 5 | 5 | 5 | 5 | 5 | 5 |
| 7 | none | 0.55 | Std. | 5 | 5 | 5 | 5 | 5 | 5 | 5 | 5 |

The esters of the present invention provide unexpected benefits over prior art benzoate coalescing agents.

As shown below, isodecyl benzoate performs better than n-butyl benzoate (as taught in European Patent Application No. 26982 of Friel) in an actual paint formulation in the following test:

| | Isodecyl Benzoate | n-butyl benzoate |
|---|---|---|
| Freeze thaw ASTM D-2243-82 | Passed 4 cycles | Fails 1st cycle |

When it comes to the freeze thaw test, the esters of the present invention provide particularly unexpected benefits over n-butyl benzoate in actual paint formulations. The failure of n-butyl benzoate for the freeze thaw test demonstrates that n-butyl benzoate destabilizes the paint formulation, whereas isodecyl benzoate does not. This is believed to be true due to the significant difference between the two compounds in the number of carbon atoms. During the freeze thaw test, the paint coagulates to lumps when n-butyl benzoate is used, thereby rendering the paint totally unusable for its intended purpose. Further, no additional processing presently known can salvage the paint after it has failed the freeze thaw test. This is not the case when isodecyl benzoate of the present invention is used.

Another use of the present compound is as plastisols. In essence, a plastisol is a dispersion of a synthetic elastomer in a plasticizor together optionally with fillers, pigment and stabilizers. The plasticizer compounds enable the elastomer being plasticized to be sufficiently flexible to be formed into articles. In the absence of the plasticizer, the elastomers are too rigid to be useful. A typical formula would be as follows:

| Polyvinyl chloride | 100 Parts |
|---|---|
| Compound of Present Invention | 50 Parts |
| Stabilizer | 3 Parts |

In preparing these plastisols, normally the polymer will constitute from about 60 to about 75 percent by weight, the present compound about 30 to about 40 percent by weight and the stabilizer about one to about five weight percent.

The choice of the stabilizers is dependent on the polymer, as stabilizers known as useful with the specific polymers can also be used in this application. Typical of these materials are barium and cadmium phenate.

In order to demonstrate the usefulness of the present compounds as plastisols, thermogravimetric analyses, gel point, viscosity and film volatility are performed. The present compounds are able to meet the requirement of all of the listed tests so as to function as plastisols.

Another important utility of the present compounds is in the preparation of caulks. A caulk must be able to stay in place once it is applied to fill a space, normally a crack. Caulks are water based systems.

The major component of a caulk is the polymer emulsion This component will generally constitute a minimum of 90 percent by weight of the caulk A highly desirable emulsion for use in the caulk is an acrylic emulsion. Other significant components are the plasticizer and the thickner. These components can constitute up to three weight percent of the caulk composition.

In a typical caulk composition, the present compound would be premixed with the lesser components, i.e., defoamers, ethylene glycol, sodium lauryl sulfate, etc. and then with a portion of the acrylic emulsion for a few minutes. Then this mixture would be mixed with the remainder of the acrylic emulsion, the defoamer and ammonium hydroxide for a few additional minutes A typical formula is:

| Premix | |
| --- | --- |
| Solid sodium lauryl sulfate | 1.2 pounds |
| Ethylene glycol | 2.6 |
| Compound of present invention | 13.0 |
| Defoamer | 1.6 |

This premix is then mixed for five minutes with:

| Acrylic emulsion | 338.4 pounds |
| --- | --- |
| Thickner | 15 |

This mixture is then mixed for an additional five minutes with:

| Acrylic emulsion | 507.5 pounds |
| --- | --- |
| Ammonium hydroxide | 3.2 |

| -continued | |
| --- | --- |
| Defoamer | 1.6 |

This product is an excellent caulk. As can be seen from this formulation, the presence of the components other than the present compounds does not vary from the preparation of known caulk formulations and, thus, is within the skill of the art. The important fact is that the new compounds of this invention can be used in the preparation of caulks.

In addition to foregoing uses of the present compounds as coalescing agents, plastisols and in the preparation of caulks, these compounds have several other utilities:

1) a purge for polyurethane equipment;
2) a plasticizer for polyurethane;
3) a solvent for alkyls in the preparation of coatings; and
4) a plasticizer for polyvinyl acetate copolymer adhesives.

I claim:

1. A paint composition comprising a mixture of latex, pigment and adjuvents, which includes a coalescing amount of isodecyl benzoate, said composition being characterized by stability as determined by freeze thaw test ASTM D-2243-82.

2. The paint composition of claim 1 wherein the coalescing amount of isodecyl benzoate is present in an amount of from about 4 to 12 percent by weight of the paint composition.

* * * * *

UNITED STATES PATENT AND TRADEMARK OFFICE
CERTIFICATE OF CORRECTION

PATENT NO.   : 5,236,987
DATED        : August 17, 1993
INVENTOR(S)  : William D. Arendt It is certified that error appears in the above-indentified patent and that said Letters Patent is hereby corrected as shown below:

At Column 3, lines 7-8, delete "isooctyl benzoate, nonylbenzoate" and insert --isoundecyl benzoate,--.

Signed and Sealed this

Twenty-ninth Day of March, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.   : 5,236,987
DATED        : August 17, 1993
INVENTOR(S)  : William D. Arendt It is certified that error appears in the above-identified patent and that said Letters Patent is hereby corrected as shown below:

Column 1,
Lines 19 and 20, delete "texanol" and insert -- TEXANOL® --

Column 4,
Line 45, delete "Texanol" and insert -- TEXANOL® --
Line 1 of the 2nd chart, delete "TEXANOL" and insert -- TEXANOL® --

Column 5,
Line 10, delete "texanol" and insert -- TEXANOL® --
Line 34, delete "Texanol" and insert -- TEXANOL® --
Line 35, delete "texanol" and insert -- TEXANOL® --

Column 7,
Line 60, delete "texanol" and insert -- TEXANOL® --

Column 8,
Line 9, delete "Texanol" and insert -- TEXANOL® --
Line 4 of the 2nd chart, delete "Texanol" and insert -- TEXANOL® --
    (this occurs three times on the line)
Line 6 of the 2nd chart, delete "Texanol" and insert -- TEXANOL® --

Column 9,
Line 7, delete "Texanol" and insert -- TEXANOL® --
Line 4 of the 2nd chart, delete "Texanol" and insert -- TEXANOL® --
    (this occurs three times on the line)
Line 6 of the 2nd chart, delete "Texanol" and insert -- TEXANOL® --

UNITED STATES PATENT AND TRADEMARK OFFICE
CERTIFICATE OF CORRECTION

PATENT NO. : 5,236,987
DATED : August 17, 1993
INVENTOR(S) : William D. Arendt

It is certified that error appears in the above-identified patent and that said Letters Patent is hereby corrected as shown below:

Column 10,
Line 9, delete "Texanol" and insert -- TEXANOL® --
Line 4 of the 2$^{nd}$ chart, delete "Texanol" and insert -- TEXANOL® --
 (this occurs three times on the line)
Line 6 of the 2$^{nd}$ chart, delete "Texanol" and insert -- TEXANOL® --

Signed and Sealed this

Seventh Day of May, 2002

Attest:

Attesting Officer

JAMES E. ROGAN
*Director of the United States Patent and Trademark Office*